United States Patent
Ahn et al.

(10) Patent No.: US 10,587,387 B2
(45) Date of Patent: *Mar. 10, 2020

(54) METHOD AND APPARATUS FOR TRANSMITTING UPLINK CONTROL INFORMATION (UCI) IN WIRELESS COMMUNICATION SYSTEM

(71) Applicant: LG ELECTRONICS INC., Seoul (KR)

(72) Inventors: Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,706

(22) Filed: Mar. 21, 2019

(65) Prior Publication Data

US 2019/0222397 A1    Jul. 18, 2019

Related U.S. Application Data

(63) Continuation of application No. 15/762,667, filed as application No. PCT/KR2016/010626 on Sep. 23, 2016, now Pat. No. 10,284,351.

(Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1671* (2013.01); *H04L 1/18* (2013.01);
(Continued)

(58) Field of Classification Search
CPC .......... H04W 72/1284; H04L 1/1812
See application file for complete search history.

(56) References Cited

U.S. PATENT DOCUMENTS

2014/0010126 A1   1/2014  Sayana ................. H04J 3/1694
                                                        370/280
2014/0140281 A1   5/2014  Choudhury et al.
(Continued)

FOREIGN PATENT DOCUMENTS

WO     2015/020440 A1    2/2015

OTHER PUBLICATIONS

Nokia Networks, "On PUCCH Format 4 Design", R1-154647, 3GPP TSG-RAN WG1 Meeting #82, Beijing, China, Aug. 24-28, 2015, See sections 1, 2.

(Continued)

*Primary Examiner* — Ayanah S George
(74) *Attorney, Agent, or Firm* — Dentons US LLP

(57) ABSTRACT

A method for a wireless device to which a plurality of serving cells are assigned transmitting uplink control information (UCI) in a wireless communication system is provided. The wireless device transmits uplink data in a subframe to a physical uplink shared channel (PUSCH), and transmits UCI including a hybrid automatic repeat request (HARQ) ACK/NACK and periodic channel state information (CSI) in the subframe to a physical uplink shared channel (PUCCH). The PUCCH and the PUSCH have the same demodulation reference signal (DMRS) location within the subframe.

20 Claims, 8 Drawing Sheets

Related U.S. Application Data

(60) Provisional application No. 62/232,408, filed on Sep. 24, 2015.

(51) Int. Cl.
*H04L 1/18* (2006.01)
*H04W 72/04* (2009.01)
*H04L 27/26* (2006.01)

(52) U.S. Cl.
CPC .............. *H04L 1/1812* (2013.01); *H04L 5/00* (2013.01); *H04L 5/0057* (2013.01); *H04W 72/04* (2013.01); *H04L 27/2601* (2013.01); *H04L 27/2602* (2013.01)

(56) References Cited

U.S. PATENT DOCUMENTS

| 2015/0215930 A1 | 7/2015 | Kim | H04W 52/0212 |
| | | | 370/329 |
| 2016/0192388 A1* | 6/2016 | Ekpenyong | H04W 72/1284 |
| | | | 370/329 |

OTHER PUBLICATIONS

Sharp, "Multiplexing of multiple periodic CSIs for CA beyond 5 carriers", R1-154061, 3GPP TSG RAN WG1 Meeting #82, Beijing, China, Aug. 24-28, 2015, See section 2.1.
NTT DOCOMO, Inc., "PUCCH formats for CA with up to 32 CCs", R1-154428, 3GPP TSG RAN WG1 Meeting #82, Beijing, China, Aug. 24-28, 2015, See sections 2, 3.

* cited by examiner

METHOD AND APPARATUS FOR TRANSMITTING UPLINK CONTROL INFORMATION (UCI) IN WIRELESS COMMUNICATION SYSTEM

CROSS-REFERENCE TO RELATED APPLICATIONS

This application is a continuation of U.S. patent application Ser. No. 15/762,667 filed on Mar. 23, 2018, now allowed, which is a National Stage Application of International Application No. PCT/KR2016/010626 filed on Sep. 23, 2016, and claims priority to U.S. Provisional Application No. 62/232,408 filed on Sep. 24, 2015, all of which are hereby incorporated by reference in their entireties as if fully set forth herein.

BACKGROUND OF THE INVENTION

Field of the Invention

The present invention relates to wireless communication, and more particularly, to a method of transmitting uplink control information in a wireless communication system, and an apparatus using the method.

Related Art $3^{rd}$ generation partnership project (3GPP) long term evolution-advanced (LTE-A) is a technique satisfying a bandwidth of up to 100 MHz and a data rate of up to 1 Gbps. Carrier aggregation (CA) is one of techniques for increasing a maximum bandwidth by using a plurality of component carriers. One component carrier operates for one serving cell, and as a result, a terminal receives a service provided from a plurality of serving cells.

With the increase in the number of supported serving cells, an amount of feedback information reported by the terminal also increases. The feedback information includes channel state information (CSI), hybrid automatic repeat request (HARQ) ACK/NACK, or the like.

A physical uplink control channel (PUCCH) is defined for transmission of the feedback information. 3GPP LTE-A provides various PUCCH formats such as a PUCCH format 1/1a/1b, a PUCCH format 2/2a/2b, a PUCCH format 3, a PUCCH format 4, a PUCCH format 5, or the like according to a payload size.

With the increase in the number of serving cells supported in a CA environment, a method of transmitting uplink control information is proposed.

SUMMARY OF THE INVENTION

The present invention provides a method for transmitting uplink control information in a wireless communication system, and a device using the method.

In an aspect, a method for transmitting uplink control information in a wireless communication system is provided. The method is performed by a wireless device to which a plurality of serving cells are configured. The method includes receiving, by the wireless device, a simultaneous transmission indicator that enables a simultaneous transmission of a physical uplink shared channel (PUSCH) and a physical uplink shared channel (PUCCH), transmitting, by the wireless device, uplink data on the PUSCH in a subframe, and transmitting, by the wireless device, uplink control information (UCI) on the PUSCH in the subframe, the UCI including a hybrid automatic repeat request (HARQ) acknowledgement (ACK)/not-acknowledgement (NACK) and periodic channel state information (CSI). The PUCCH and the PUSCH have the same demodulation reference signal (DMRS) position in the subframe.

In another aspect, a device for which a plurality of serving cells are configured in a wireless communication system includes a transceiver configured to transmit and receive a radio signal, and a processor coupled to the transceiver. The processor is configured to receive a simultaneous transmission indicator that enables a simultaneous transmission of a physical uplink shared channel (PUSCH) and a physical uplink shared channel (PUCCH), transmit uplink data on the PUSCH in a subframe, and transmit uplink control information (UCI) on the PUSCH in the subframe, the UCI including a hybrid automatic repeat request (HARQ) acknowledgement (ACK)/not-acknowledgement (NACK) and periodic channel state information (CSI). The PUCCH and the PUSCH have the same demodulation reference signal (DMRS) position in the subframe.

A wireless device for which a plurality of serving cells are configured can transmit uplink control information on various types of uplink control channels.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE)/LTE-advanced (LTE-A). However, this is for exemplary purposes only, and thus the present invention is also applicable to various wireless communication networks.

The wireless device may be served by a plurality of serving cells. Each serving cell may be defined with a downlink (DL) component carrier (CC) or a pair of a DL CC and an uplink (UL) CC. The plurality of serving cells may be managed by one BS, or may be managed by a plurality of BSs. The plurality of serving cells may be divided into a plurality of cell groups.

The serving cell may be classified into a primary cell (PCell) and a secondary cell (SCell). The PCell operates at a primary frequency, and is a cell designated as the PCell when an initial network entry process is performed or when a network re-entry process starts or in a handover process. The PCell is also called a reference cell. The SCell operates at a secondary frequency. The SCell may be configured after a radio resource control (RRC) connection is established, and may be used to provide an additional radio resource. At least one PCell is configured always. The SCell may be added, modified, or released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
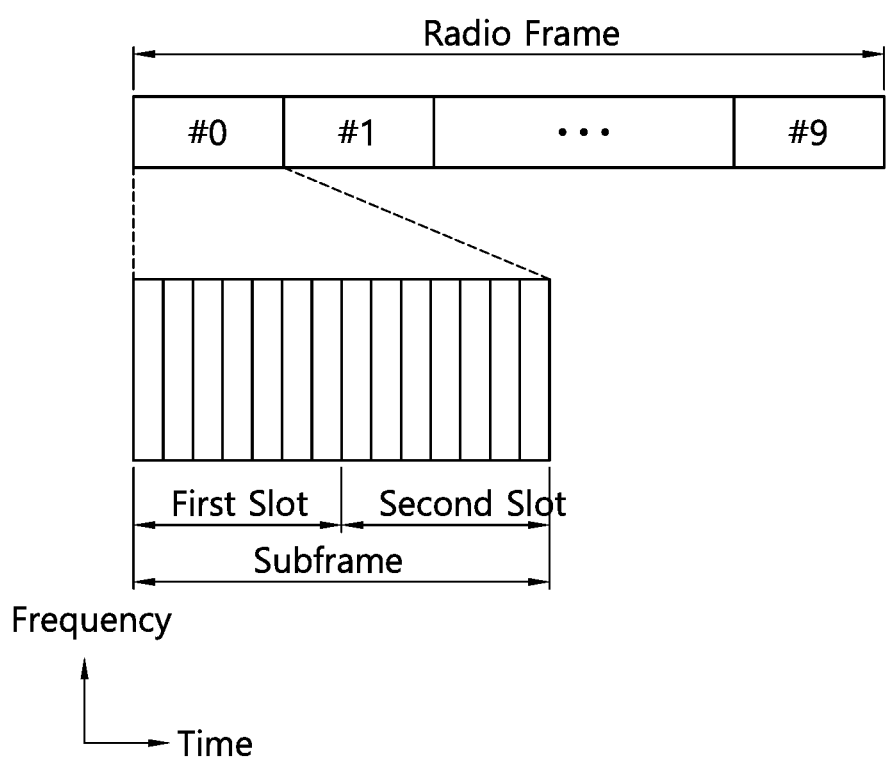
FIG. 1 shows a subframe structure in 3rd generation partnership project (3GPP) long term evolution-advanced (LTE-A).

FIG. 1 shows a subframe structure in 3GPP LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 14 OFDM symbols for example, the number of OFDM symbols included in one slot may vary depending on a length of a cyclic prefix (CP). According to 3GPP LTE-A, in case of a normal CP, one slot includes 14 OFDM symbols, and in case of an extended CP, one slot includes 12 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A physical channel of 3GPP LTE-A may be classified into a downlink (DL) physical channel and an uplink (UL) physical channel. The DL physical channel includes a physical downlink control channel (PDCCH), a physical control format indicator channel (PCFICH), a physical hybrid-ARQ indicator channel (PHICH), and a physical downlink shared channel (PDSCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The UL physical channel includes a physical uplink control channel (PUCCH) and a physical uplink shared channel (PUSCH). The PUCCH is allocated in an RB pair in a subframe. RBs belonging to the RB pair occupy different subcarriers in each of a $1^{st}$ slot and a $2^{nd}$ slot. The PUSCH is allocated by a UL grant on the PDCCH. In a normal CP, a $4^{th}$ OFDM symbol of each slot is used in transmission of a demodulation reference signal (DMRS) for the PUSCH.

Uplink control information (UCI) includes at least any one of HARQ ACK/NACK, channel state information (CSI), and a scheduling request (SR). Hereinafter, as an indicator for indicating a state of a downlink (DL) channel, the CSI may include at least any one of a channel quality indicator (CQI) and a precoding matrix indicator (PMI).

In order to transmit a variety of UCI on a PUCCH, a combination between the UCI and the PUCCH is defined as a PUCCH format as shown in the following table.

TABLE 1

| PUCCH format | UCI to be transmitted |
| --- | --- |
| PUCCH format 1 | Positive SR |
| PUCCH format 1a/1b | 1-bit or 2-bit HARQ ACK/NACK |
| PUCCH format 2 | CSI report |
| PUCCH format 2a/2b | CSI report and 1-bit or 2-bit HARQ ACK/NACK |
| PUCCH format 3 | HARQ ACK/NACK, SR, CSI |

The PUCCH format 1a/1b is used to carry the 1-bit or 2-bit HARQ ACK/NACK by using binary phase shift keying (BPSK) modulation or quadrature phase shift keying (QPSK) modulation.

The PUCCH format 3 is used to carry encoded UCI of 48 bits. The PUCCH format 3 may carry HARQ ACK/NACK for a plurality of serving cells and a CSI report for one serving cell.

Figure 2:
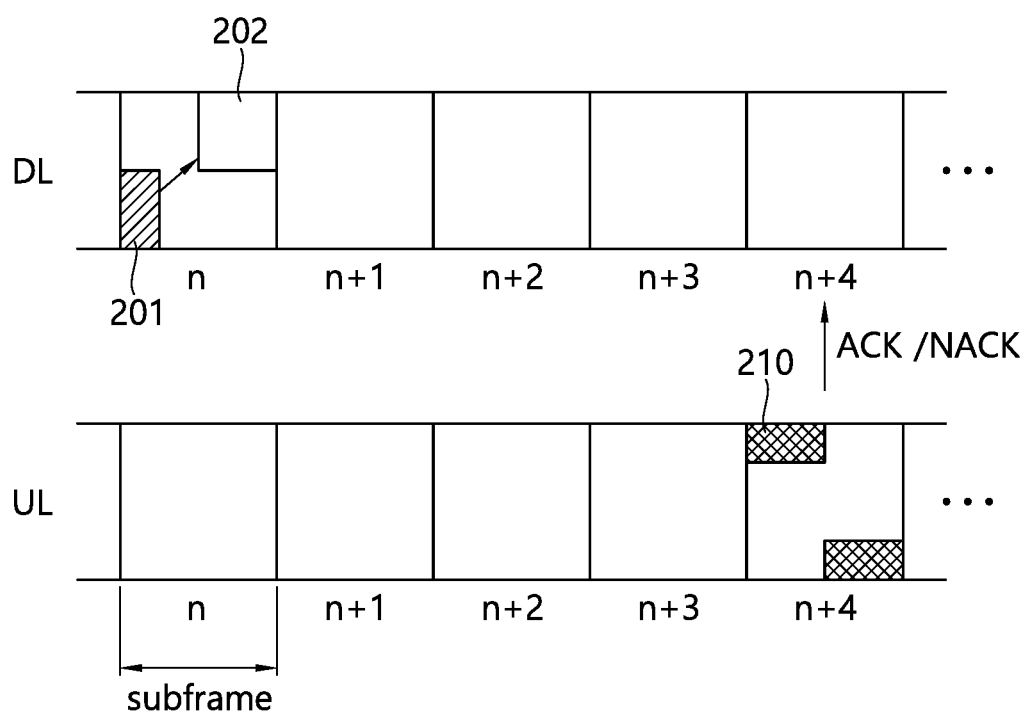
FIG. 2 shows an example of performing hybrid automatic repeat request (HARQ).

FIG. 2 shows an example of performing HARQ.

A wireless device monitors a PDCCH, and receives a DL grant including a DL resource allocation on a PDCCH 201 (or EPDDCH) in a DL subframe n. The wireless device receives a DL transport block through a PDSCH 202 indicated by the DL resource allocation.

The wireless device transmits an ACK/NACK signal for the DL transport block on a PUCCH 210 in a UL subframe n+4. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE-A, a PUCCH format 1/1a/1b, a PUCCH format 2/2a/2b, a PUCCH format 3, a PUCCH format 4 and a PUCCH format 5 are used to carry an ACK/NACK signal which is a reception acknowledgement for HARQ. All PUCCH formats use different resource blocks in two slots.

Figure 3:
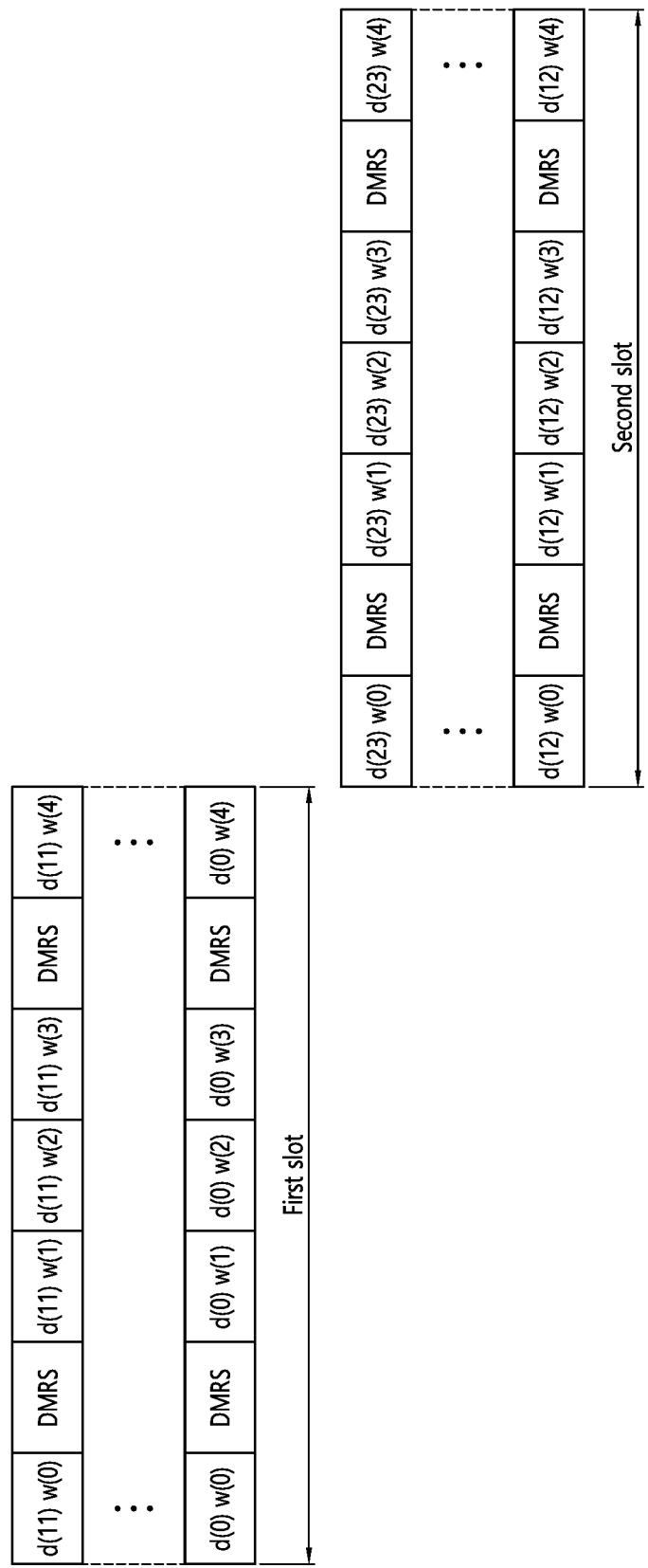
FIG. 3 shows an example of a channel structure for a physical uplink control channel (PUCCH) format 3.

FIG. 3 shows an example of a channel structure for a PUCCH format 3.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 3 may carry 24 data symbols d(0) to d(23). When using QPSK, the PUCCH format 3 may carry 48 encoded bits.

In a first slot, first 12 data symbols d(0) to d(11) are spread in a time domain by using an orthogonal code W(j)={w(0), w(1), w(2), w(3), w(4)}. The time-domain spreading includes that w(i) corresponds to each OFDM symbol in a slot. In a second slot, second 12 data symbols d(12) to d(23) are spread in the time domain by using the orthogonal code W(j).

A time/frequency/code resource used in PUCCH transmission is called a PUCCH resource. For example, an orthogonal code index, a cyclic shift index, and a resource block index are required for the PUCCH format 1/1a/1b. A cyclic shift index and a resource block index are required for the PUCCH format 2/2a/2b. An orthogonal code index and a resource block index are required for the PUCCH format 2/2a/2b. A resource index is a parameter used to determine a corresponding PUCCH resource.

A resource index for the PUCCH format 1a/1b for ACK/NACK is given by a corresponding DL grant. Although a resource index for the PUCCH format 3 for ACK/NACK is given by a corresponding DL grant, this is designated in a pre-designated resource index set. For example, a BS pre-designates 4 resource indices for the PUCCH format 3 through an RRC message. In addition, one of the 4 resource indices may be designated through a resource indicator in a DL grant (this is called an 'ACK/NACK resource indicator (ARI)').

Figure 4:
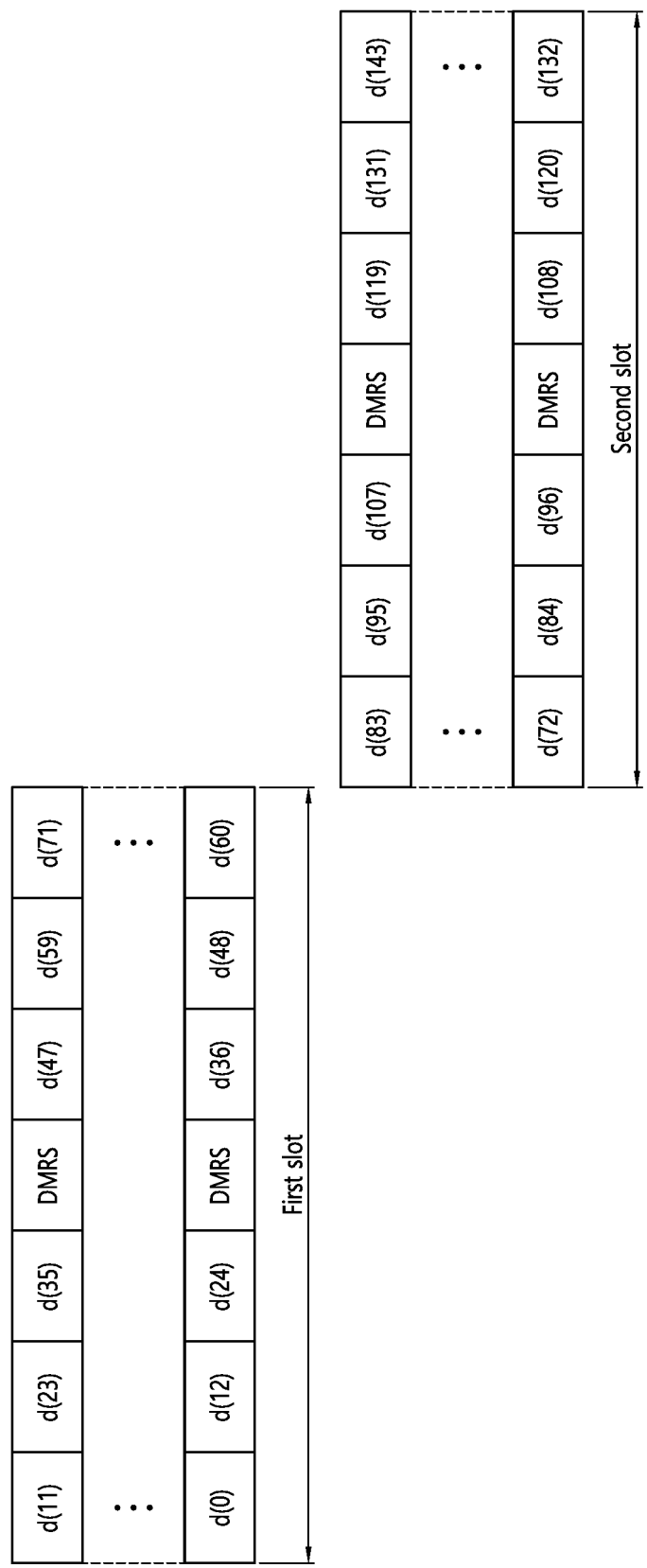
FIG. 4 shows an example of a channel structure for a PUCCH format 4.

FIG. 4 shows an example of a channel structure for a PUCCH format 4.

One slot includes 7 OFDM symbols. An OFDM symbol in the middle (i.e., a $4^{th}$ OFDM symbol) is an RS OFDM symbol for DMRS. The remaining 6 OFDM symbols are data OFDM symbols for UCI. If one slot includes 6 OFDM symbols, a $3^{rd}$ OFDM symbol is an RS OFDM symbol, and the remaining 5 OFDM symbols are data OFDM symbols.

The extended PUCCH format does not use frequency-domain spreading and time-domain spreading. When one resource is allocated to the extended PUCCH format, 12 data symbols may be transmitted for each OFDM symbol. Therefore, 144 data symbols d(0) to d(143) may be transmitted in one subframe. When using QPSK, the extended PUCCH format may carry 288 encoded bits.

Figure 5:
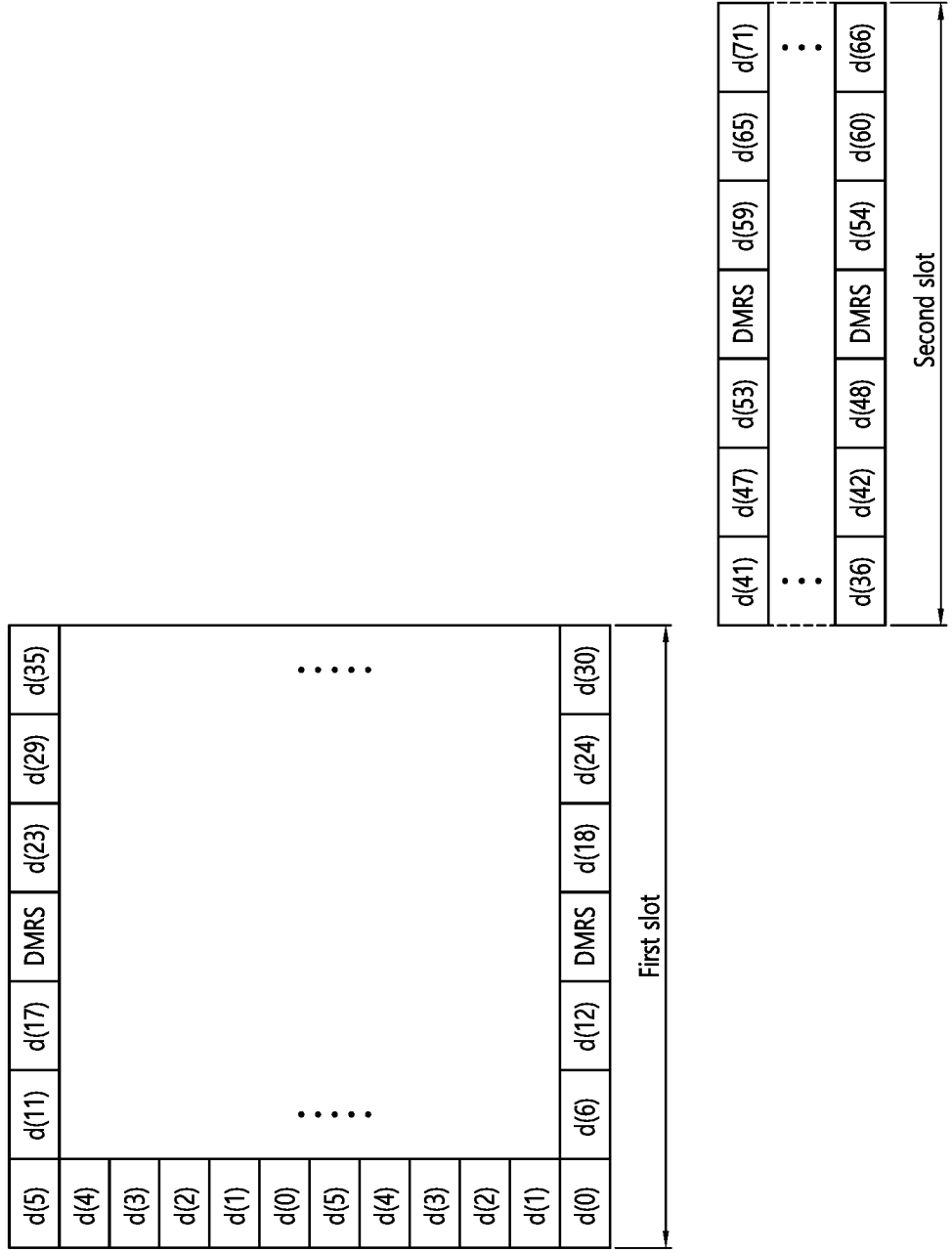
FIG. 5 shows an example of a channel structure for a PUCCH format 5.

FIG. 5 shows an example of a channel structure for a PUCCH format 5.

In comparison with the channel structure of FIG. 3, 6 data symbols are repeated in one resource block for each OFDM symbol. For example, {d(0), d(1), d(2), d(3), d(4), d(5), d(0), d(1), d(2), d(3), d(4), d(5)} is transmitted in a first OFDM symbol. Accordingly, although 144 data symbols can be transmitted in the channel structure of FIG. 3, 72 data symbols d(0) to d(71) may be transmitted in this channel structure. When using QPSK, the extended PUCCH format may carry 144 encoded bits.

In order to support multi-user multiplexing, code division multiplexing (CDM) may be supported in a data symbol repeated in each OFDM symbol. For example, {+d(0), +d(1), +d(2), +d(3), +d(4), +d(5), +d(0), +d(1), +d(2), +d(3), +d(4), d(5)} may be transmitted through CDM 0, and {+d(0), +d(1), +d(2), +d(3), +d(4), +d(5), −d(0), −d(1), −d(2), −d(3), −d(4), −d(5)} may be transmitted through CDM 1. A cyclic shift value used in DMRS may vary depending on the CDM.

A plurality of resource blocks may be allocated to the PUCCH format 4. That is, only one resource block may be allocated to the conventional PUCCH format 1/2/3, whereas one or more resource blocks may be allocated to the PUCCH format 4.

Similarly to the configuration of the PUCCH format 3, in the resource configuration for the PUCCH format 4/5, a plurality of candidate resources may be configured in advance through an RRC message, and one of the plurality of candidate resources may be designated through a DL grant.

The PUCCH formats 4 and 5 provide a great payload and have the same DMRS structure as the PUSCH, and thus have a characteristic similar to PUSCH transmission.

A plurality of cells are configured for a wireless device in a CA environment. UCI for a plurality of cells is transmitted on a PUCCH. HARQ ACK/NACK includes ACK/NACK across all of the configured plurality of cells. The UCI may include the HARQ ACK/NACK for the plurality of cells, an SR for a scheduling request, and/or a CSI report for the plurality of cells.

Simultaneous transmission of a PUSCH and a PUCCH is prohibited in the existing 3GPP LTE since transmit power of the wireless device is limited. Herein, the simultaneous transmission implies that the PUSCH and the PUCCH are transmitted in one subframe. However, the simultaneous transmission of the PUSCH and the PUCCH is possible in 3GPP LTE-A. A BS may transmit a simultaneous transmission indicator to the wireless device to inform the wireless device of whether the simultaneous transmission of the PUSCH and the PUSCCH is possible. If the simultaneous transmission is possible, the wireless device may transmit the PUSCH and the PUCCH in one subframe.

It becomes possible that a plurality of cells are configured, an amount of UCI increases, various PUCCH formats are configured, and PUCCH-PUSCH simultaneous transmission is achieved. Therefore, it is required to clarify which PUCCH format will be used by the wireless device in a specific situation. This is because, when there is a discrepancy in a PUCCH format used between the BS and the wireless device, UCI for carrying the PUCCH format is lost.

Hereinafter, a PUCCH format 4/5 in which a DMRS is transmitted at the same position as a DMRS of the PUSCH is collectively referred to as a physical uplink shared control channel (PUSCCH). When it is said that the PUSCCH is configured, it means that at least any one of the PUCCH format 4 and the PUCCH format 5 is configured.

A UE may support the following capabilities and may inform the BS of whether the capability is supported.

multiClusterPUSCH-WithinCC: The UE may transmit the PUSCH by using an RB cluster separated in a frequency domain in one subframe for one cell.

Simultaneous PUCCH-PUSCH: The UE may simultaneously transmit the PUCCH and the PUSCH in one subframe.

The BS which has identified that the capability is supported may instruct the UE to activate the capability. A UE which supports both of the above two capabilities may simultaneously transmit the PUSCH and the PUSCCH in one subframe.

The simultaneous transmission indicator transmitted by the BS to the UE enables the UE to simultaneously transmit the PUCCH and the PUSCH. If the simultaneous transmission indicator indicates that simultaneous transmission is not allowed, the UE piggybacks UCI on the PUSCH instead of transmitting the PUCCH in a subframe in which the PUSCH is scheduled.

The PUCCH and/or the PUSCCH may always be transmitted only in a primary cell.

The following operation is proposed with regards to PUSCH-PUCCH/PUSCCH simultaneous transmission.

In a first embodiment, a UE which has informed that both MultiCluster PUSCH-WithinCC and Simultaneous PUCCH-PUSCH are not supported may also support simultaneous transmission of a PUSCCH and a PUSCH in one subframe between different subframes. A UE which supports the PUSCCH may support simultaneous transmission of the PUSCCH and the PUSCH in the same subframe between different cells. For example, the UE may transmit the PUSCCH in a subframe 4 of a first cell, and may transmit the PUSCH in the subframe 4 of the first cell.

In a second embodiment, a UE which supports only MultiCluster PUSCH may transmit the PUSCCH and the PUSCH in one subframe for one cell.

In a third embodiment, a UE for which a plurality of cells are configured and for which PUSCH-PUCCH simultaneous transmission is configured transmits UCI on the PUSCCH when the PUSCCH is configured. Although the UCI is piggybacked on the PUSCH in the conventional 3GPP LTE, the UCI may be transmitted on the PUSCCH instead of on the PUSCH.

Figure 6:
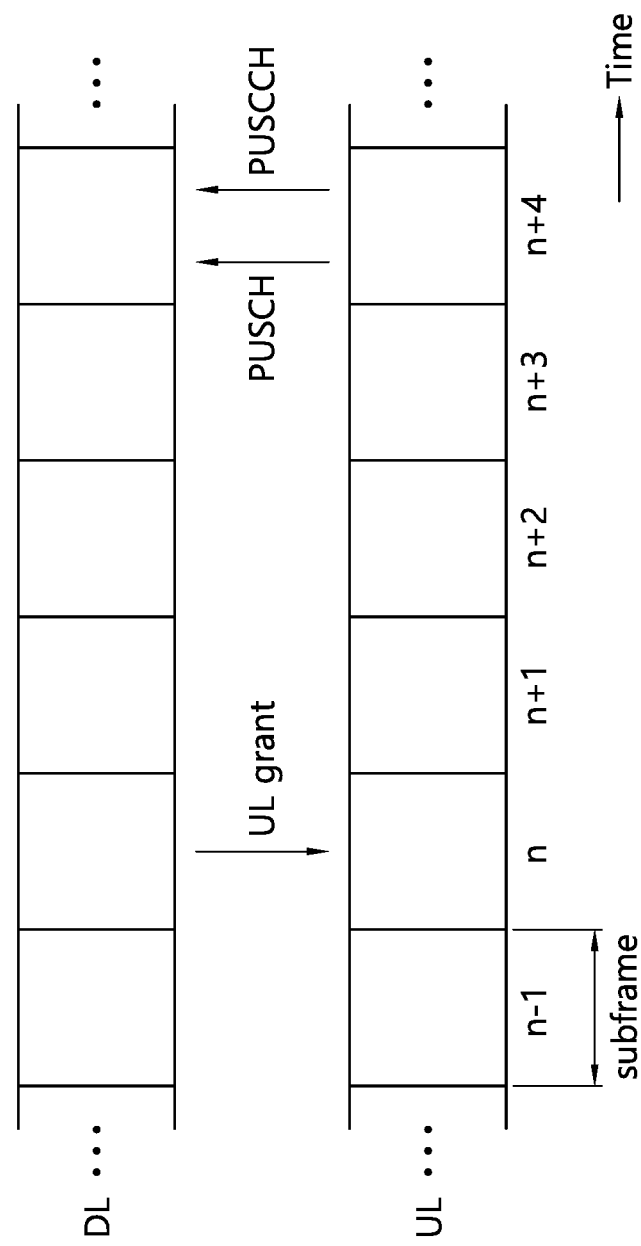
FIG. 6 shows uplink transmission according to an embodiment of the present invention.

FIG. 6 shows uplink transmission according to an embodiment of the present invention. This is an example of frequency division duplex (FDD) transmission, but the present embodiment may also be applied to time division duplex (TDD) transmission.

It is assumed that a plurality of serving cells are configured for a wireless device, and whether PUSCH-PUCCH simultaneous transmission is possible is given. A PUSCCH is configured for the wireless device. If at least one PUCCH format-4 resource and/or at least one PUCCH format-5 resource are given, the PUSCCH may be configured. The BS may transmit information regarding the configuration to the wireless device through an RRC message.

A multiplexing indicator regarding whether ACK/NACK and CSI can be multiplexed to one PUSCCH as UCI may be given to the wireless device. For example, if the multiplexing indicator is FALSE, the ACK/NACK and the CSI cannot be multiplexed to one PUSCCH as the UCI, and if the multiplexing indicator is TRUE, the ACK/NACK and the CSI can be multiplexed to one PUSCCH as the UCI.

First, in a subframe n, the wireless device receives a UL grant for PUSCH scheduling. In a subframe n+4, the wireless device transmits a scheduled PUSCH. In this case, in the subframe n+4, when HARQ ACK/NACK and a periodic CSI report are triggered, the following operation may be performed.

(1) If PUSCH-PUCCH simultaneous transmission is not configured, the HARQ ACK/NACK and the periodic CSI report are piggybacked on the PUSCH.

(2) If PUSCH-PUCCH simultaneous transmission is configured and the PUSCCH is not configured, the HARQ ACK/NACK is transmitted on the PUCCH and the periodic CSI report is piggybacked on the PUSCH.

(3) If PUSCH-PUCCH simultaneous transmission is configured and the PUSCCH is configured, the HARQ ACK/NACK and the periodic CSI report are transmitted on the PUSCCH.

When simultaneous transmission of the PUSCH and the PUCCH is triggered in a situation where a plurality of cells are configured, it may be allowed to transmit UCI always on the PUSCCH, so that a discrepancy of a channel format can be prevented between the BS and the wireless device.

In addition, if a multiplexing indicator is given, an operation (3) may be as follows.

(3-1) If PUSCH-PUCCH simultaneous transmission is configured, the PUSCCH is configured, and the multiplexing indicator is FASLE, then the HARQ ACK/NACK is transmitted on the PUCCH or the PUSCCH and the periodic CSI report is piggybacked on the PUSCH.

(3-1) If PUSCH-PUCCH simultaneous transmission is configured, the PUSCCH is configured, and the multiplexing indicator is TRUE, then the HARQ ACK/NACK and the periodic CSI report are transmitted on the PUSCCH.

Figure 7:
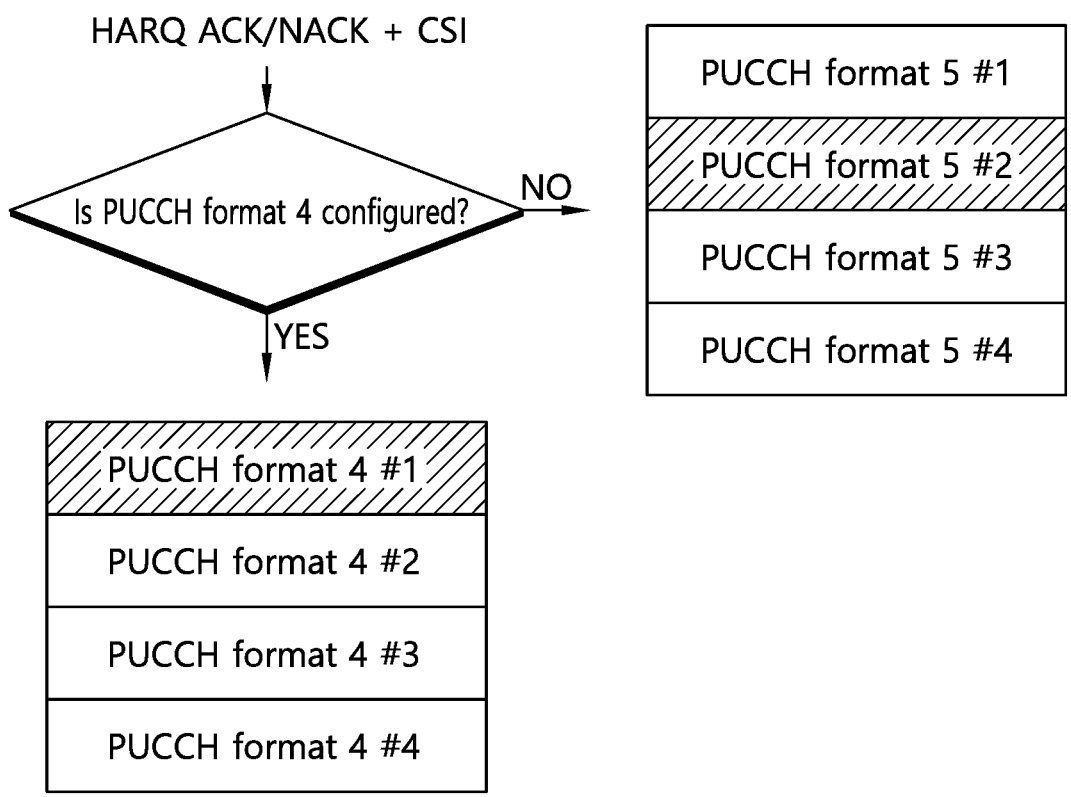
FIG. 7 shows an example of transmitting uplink control information (UCI) on a physical uplink shared control channel (PUSCCH).

FIG. 7 shows an example of transmitting UCI on a PUSCCH.

In the above operation (3-1), if PUSCH-PUCCH simultaneous transmission is configured, the PUSCCH is configured, and the multiplexing indicator is TRUE, then the HARQ ACK/NACK and the periodic CSI report are transmitted on the PUSCCH.

The total number of bits of the HARQ ACK/NACK and the periodic CSI report is a UCI payload for the PUSCCH. The UCI payload may have a size greater than or equal to 22 bits.

Four resources for a PUCCH format 4 or four resources for a PUCCH format 5 may be configured. The number of resources is for exemplary purposes only. If the PUCCH format 4 is configured, a wireless device selects at least any one of the configured four PUCCH format-4 resources. If the PUCCH format 4 is not configured, the wireless device selects at least any one of the configured four PUCCH format-5 resources. A DL grant corresponding to the HARQ ACK/NACK may include a resource indicator indicating which resource is selected among a plurality of PUCCH resources.

Meanwhile, the wireless device may determine whether a part of UCI will be piggybacked on the PUSCH by considering a UCI payload and the number of RBs allocated to the PUSCH/PUSCCH.

By considering the number of PUSCH RBs used in UCI transmission and a payload size of UCI to be transmitted, a part of UCI may be piggybacked on the PUSCH and the remaining parts may be transmitted on the PUSCCH. Alternatively, by considering the number of PUSCCH RBs used in UCI transmission and the payload size of UCI to be transmitted, a part of UCI may be piggybacked on the PUSCH and the remaining parts may be transmitted on the PUSCCH. For example, if a size of the UCI payload exceeds the payload size of the PUSCCH, the part of UCI may be piggybacked on the PUSCH. The part of UCI to be piggybacked on the PUSCH may include CSI.

A UCI code rate may be calculated based on the number of RBs and the UCI payload size. If a code rate of UCI to be transmitted on the PUSCH is greater than or equal to a specific value, all pieces of UCI may be transmitted on the PUSCCH. Alternatively, if the code rate of the UCI to be transmitted on the PUSCCH is greater than or equal to the specific value, a part of UCI may be piggybacked on the PUSCH. The UCI payload to be transmitted on the PUSCH may be determined by considering the code rate of the UCI to be transmitted on the PUSCCH.

If both of the code rate of the UCI to be transmitted on the PUSCCH and the code rate of the UCI to be transmitted on the PUSCH are greater than or equal to a specific value, the UCI may be preferentially transmitted on the PUSCCH.

Figure 8:
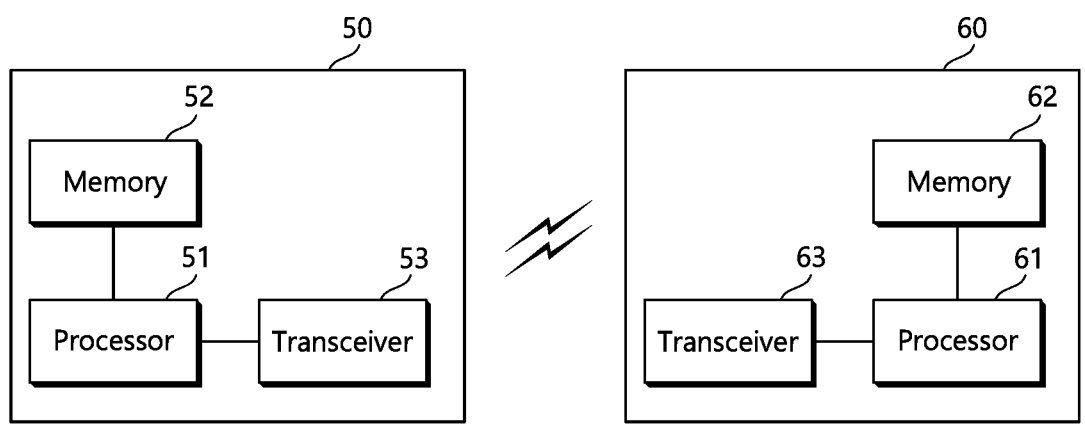
FIG. 8 is a block diagram showing a wireless communication system according to an embodiment of the present invention.

FIG. 8 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in a licensed band and/or an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting uplink control information (UCI) in a wireless communication system, the method performed by a wireless device comprising:
   receiving a simultaneous transmission indicator that enables a simultaneous transmission of a physical uplink shared channel (PUSCH) and a physical uplink shared channel (PUCCH) in one subframe;
   receiving a multiplexing indicator indicating whether a hybrid automatic repeat request (HARQ) ACK/NACK and periodic channel state information (CSI) are multiplexed in the UCI when the HARQ ACK/NACK and the periodic CSI are triggered in one subframe;
   transmitting uplink data on the PUSCH in a subframe; and
   transmitting the UCI on the PUCCH in the subframe, the UCI including the HARQ ACK/NACK,
   wherein the periodic CSI is further included in the UCI when the multiplexing indicator indicates that the HARQ ACK/NACK and the CSI are multiplexed in the UCI, and the periodic CSI is included in the uplink data when the multiplexing indicator indicates that the HARQ ACK/NACK and the CSI are not multiplexed in the UCI.

2. The method of claim 1, wherein a payload size of the UCI is greater than 22 bits.

3. The method of claim 1, wherein the subframe in which the PUSCH and the PUCCH are transmitted includes a plurality of orthogonal frequency division multiplexing (OFDM) symbols.

4. The method of claim 3, wherein the subframe includes 14 OFDM symbols.

5. The method of claim 3, wherein two demodulation reference signals (DM RSs) for the PUCCH are mapped to same OFDM symbols in the subframe with two DM RSs for the PUSCH.

6. The method of claim 5, wherein the two DM RSs for the PUCCH are mapped to fourth and eleventh OFDM symbols of the subframe.

7. The method of claim 1, further comprising:
   receiving a resource configuration for the PUCCH, the resource configuration including information on at least one resource block allocated to the PUCCH.

8. A device comprising:
   a transceiver configured to transmit and receive a radio signal; and
   a processor coupled to the transceiver and configured to:
   control the transceiver to receive a simultaneous transmission indicator that enables a simultaneous transmission of a physical uplink shared channel (PUSCH) and a physical uplink shared channel (PUCCH) in one subframe;
   control the transceiver to receive a multiplexing indicator indicating whether a hybrid automatic repeat request (HARQ) ACK/NACK and periodic channel state information (CSI) are multiplexed in the UCI when the HARQ ACK/NACK and the periodic CSI are triggered in one subframe;
   control the transceiver to transmit uplink data on the PUSCH in a subframe; and
   control the transceiver to transmit uplink control information (UCI) on the PUCCH in the subframe, the UCI including the HARQ ACK/NACK,
   wherein the periodic CSI is further included in the UCI when the multiplexing indicator indicates that the HARQ ACK/NACK and the CSI are multiplexed in the UCI, and the periodic CSI is included in the uplink data when the multiplexing indicator indicates that the HARQ ACK/NACK and the CSI are not multiplexed in the UCI.

9. The device of claim 8, wherein a payload size of the UCI is greater than 22 bits.

10. The device of claim 8, wherein the subframe in which the PUSCH and the PUCCH are transmitted includes a plurality of orthogonal frequency division multiplexing (OFDM) symbols.

11. The device of claim 10, wherein the subframe includes 14 OFDM symbols.

12. The device of claim 10, wherein two demodulation reference signals (DM RSs) for the PUCCH are mapped to same OFDM symbols in the subframe with two DM RSs for the PUSCH.

13. The device of claim 12, wherein the two DM RSs for the PUCCH are mapped to fourth and eleventh OFDM symbols of the subframe.

14. A method performed by a base station comprising:
   transmitting a simultaneous transmission indicator that enables a simultaneous transmission of a physical uplink shared channel (PUSCH) and a physical uplink shared channel (PUCCH) in one subframe;

transmitting a multiplexing indicator indicating whether a hybrid automatic repeat request (HARQ) ACK/NACK and periodic channel state information (CSI) are multiplexed in the UCI when the HARQ ACK/NACK and the periodic CSI are triggered in one subframe;

receiving uplink data on the PUSCH in a subframe; and receiving uplink control information (UCI) on the PUCCH in the subframe, the UCI including the HARQ ACK/NACK, wherein the periodic CSI is further included in the UCI when the multiplexing indicator indicates that the HARQ ACK/NACK and the CSI are multiplexed in the UCI, and the periodic CSI is included in the uplink data when the multiplexing indicator indicates that the HARQ ACK/NACK and the CSI are not multiplexed in the UCI.

15. The method of claim 14, wherein a payload size of the UCI is greater than 22 bits.

16. The method of claim 14, wherein the subframe in which the PUSCH and the PUCCH are transmitted includes a plurality of orthogonal frequency division multiplexing (OFDM) symbols.

17. The method of claim 16, wherein two demodulation reference signals (DM RSs) for the PUCCH are mapped to same OFDM symbols in the subframe with two DM RSs for the PUSCH.

18. A device comprising:

a transceiver configured to transmit and receive a radio signal; and a processor coupled to the transceiver and configured to:

control the transceiver to transmit a simultaneous transmission indicator that enables a simultaneous transmission of a physical uplink shared channel (PUSCH) and a physical uplink shared channel (PUCCH) in one subframe;

control the transceiver to transmit a multiplexing indicator indicating whether a hybrid automatic repeat request (HARQ) ACK/NACK and periodic channel state information (CSI) are multiplexed in the UCI when the HARQ ACK/NACK and the periodic CSI are triggered in one subframe;

control the transceiver to receive uplink data on the PUSCH in a subframe; and control the transceiver to receive uplink control information (UCI) on the PUCCH in the subframe, the UCI including the HARQ ACK/NACK, wherein the periodic CSI is further included in the UCI when the multiplexing indicator indicates that the HARQ ACK/NACK and the CSI are multiplexed in the UCI, and the periodic CSI is included in the uplink data when the multiplexing indicator indicates that the HARQ ACK/NACK and the CSI are not multiplexed in the UCI.

19. The device of claim 18, wherein a payload size of the UCI is greater than 22 bits.

20. The device of claim 18, wherein the subframe in which the PUSCH and the PUCCH are transmitted includes a plurality of orthogonal frequency division multiplexing (OFDM) symbols, and wherein two demodulation reference signals (DM RSs) for the PUCCH are mapped to same OFDM symbols in the subframe with two DM RSs for the PUSCH.

* * * * *